United States Patent [19]

Kirchner et al.

[11] Patent Number: 5,670,573
[45] Date of Patent: Sep. 23, 1997

[54] COATINGS CONTAINING FLUORINATED ESTERS

[75] Inventors: Jack Robert Kirchner, Wilmington, Del.; William Wesley Bennett, Jr., Carney's Point, N.J.

[73] Assignee: E. I. Du Pont de Nemours and Company, Wilmington, Del.

[21] Appl. No.: 695,159

[22] Filed: Aug. 7, 1996

[51] Int. Cl.$^6$ .............. C08L 67/06; C08L 67/08; C08L 75/14

[52] U.S. Cl. .............. 525/7; 525/48; 525/454; 525/455

[58] Field of Search .............. 525/7, 48, 454, 525/455

[56] References Cited

U.S. PATENT DOCUMENTS

| | | | |
|---|---|---|---|
| 3,378,609 | 4/1968 | Fasick et al. | 260/890 |
| 3,462,296 | 8/1969 | Raynolds et al. | 117/161 |
| 3,491,169 | 1/1970 | Raynolds et al. | 260/900 |
| 3,923,715 | 12/1975 | Dettre et al. | 260/29.6 |
| 4,054,592 | 10/1977 | Dear et al. | 560/25 |
| 4,097,642 | 6/1978 | Dear et al. | 428/262 |
| 4,401,780 | 8/1983 | Steel | 524/225 |
| 4,539,006 | 9/1985 | Langford | 8/94.1 |
| 4,595,518 | 6/1986 | Raynolds et al. | 252/8.6 |
| 4,735,848 | 4/1988 | Kondo et al. | 428/219 |
| 4,758,471 | 7/1988 | Arioka et al. | 428/336 |
| 4,946,992 | 8/1990 | Falk et al. | 560/227 |
| 4,958,039 | 9/1990 | Pechhold | 556/421 |
| 5,087,672 | 2/1992 | Babirad et al. | 525/329.5 |
| 5,188,747 | 2/1993 | Kai et al. | 252/54 |
| 5,350,878 | 9/1994 | Caporiccio | 560/227 |

FOREIGN PATENT DOCUMENTS

| | | | |
|---|---|---|---|
| 0 068 040 | 1/1983 | European Pat. Off. | C07C 69/63 |
| 614874-A2 | 9/1994 | European Pat. Off. | C07C 67/11 |
| 694 532 | 1/1996 | European Pat. Off. | |
| 28 21 495 | 11/1979 | Germany | C09D 7/12 |
| 50-047t912 | 4/1975 | Japan. | |
| 3-167158 | 7/1991 | Japan | C07C 69/65 |
| 05246951A | 9/1993 | Japan. | |
| 05232718A | 9/1993 | Japan. | |
| WO91/18859 | 12/1991 | WIPO | C07C 43/174 |

*Primary Examiner*—Patricia A. Short

[57] ABSTRACT

Coating compositions containing an alkyd, urethane or unsaturated polyester resin and an ester of an unsaturated alcohol and fluorinated acid wherein the cured coating has an advancing hexadecane contact angle of at least about 40 degrees and improved oil and water repellency is disclosed.

7 Claims, No Drawings

COATINGS CONTAINING FLUORINATED ESTERS

FIELD OF THE INVENTION

This invention relates to coating compositions containing fluorinated esters of unsaturated alcohols that provide durable oil- and water-repellent surfaces to the cured coating, and the cured coatings derived from such compositions.

BACKGROUND OF THE INVENTION

The coating compositions of interest in the present invention are alkyd coating compositions, Type I urethane coating compositions, and unsaturated polyester resin coating compositions, typically a paint, clear coat or stain. All the above-listed coating compositions after drying or curing show low hexadecane contact angles, are readily wetted by oil, and are susceptible to soiling. The coating compositions are described in Outlines of Paint Technology, Halstead Press, New York N.Y., Third edition, 1990) and Surface Coatings Vol. I, Raw Materials and Their Usage (Chapman and Hall, New York N.Y., Second Edition, 1984). A common factor in these coating compositions is an unsaturated resin or prepolymer structure that permits the polymerization of olefinic groups in the backbone or sidechain, such that added fluorinated esters of unsaturated alcohols can be incorporated in the structure.

Conventional alkyd coatings utilize, as the binder or film-forming component, a curing or drying alkyd resin. Alkyd resin coating compositions contain unsaturated aliphatic acids derived from drying oils. These resins spontaneously polymerize in the presence of oxygen or air to yield a solid protective film. The polymerization is termed "drying" or "curing" and occurs as a result of autoxidation of the unsaturated carbon-carbon bonds in the aliphatic acid component of the oil by atmospheric oxygen. When applied to a surface as a thin liquid layer of formulated alkyd coating, the cured films that form are relatively hard, non-melting, and substantially insoluble in many organic solvents that act as solvents or thinners for the unoxidized alkyd resin or drying oil. Such drying oils have been used for centuries as raw materials for oil-based coatings and are described widely in the literature.

Urethane coatings are classified by ASTM D-1 into five categories. Type I urethane coatings contain a prereacted autoxidizable binder as described in Surface Coatings Vol. I, previously cited. Type I urethane binders, also termed urethane oils, oil-modified polyurethanes, or urethane alkyds, are the largest volume category of polyurethane coatings, and include typical paints, clear coatings and stains. Urethane coatings typically contain the reaction product of a polyisocyanate, usually toluene diisocyanate, and a polyhydric alcohol ester of drying oil acids. The cured coating is formed by air oxidation and polymerization of the unsaturated drying oil residue in the binder.

Unsaturated polyester resins contain as the unsaturated prepolymer the product obtained from the condensation polymerization of a glycol such as 1,2-propylene glycol or 1,3-butylene glycol with an unsaturated acid such as maleic (or of maleic and a saturated acid, e.g., phthalic) in the form of anhydrides. The unsaturated prepolymer is a linear polymer containing unsaturation in the chain. This is dissolved in a suitable monomer, for instance styrene, to produce the final resin. The film is produced by copolymerization of the linear polymer and monomer by means of a free radical mechanism. The free radicals can be generated by heat, or more usually by addition of a peroxide, such as benzoyl peroxide, separately packaged and added before use. Such coating compositions are frequently termed "gel coat" finishes. In order that curing can take place at room temperature the decomposition of peroxides into free radicals is catalyzed by certain metal ions, usually cobalt. The solutions of peroxide and cobalt compound are added separately to the mix and well stirred before application. The unsaturated polyester resins that cure by a free radical mechanism are also suited to irradiation curing, using, for instance, ultraviolet light. This form of cure, in which no heat is produced, is particularly suited to films on wood or board. Other radiation sources, for instance electron-beam curing, are also used.

Certain fluorinated materials are known to provide oil repellency to substrates such as textiles and carpets. For instance, perfluoroalkyl iodides have been converted sequentially to perfluoroalkyl ethyl iodides, to perfluoroalkyl ethyl alcohols, to monomers and finally polymers for application to such substrates.

The use of fluoroalkyl alcohol esters of alkanoic acids generally as lubricating aids is known. For instance, the perfluoroalkyl ethyl ester of stearic acid (octadecanoic acid) has been used for imparting lubricity and repellency to various plastics. Also, Nishihara et al., JP308469 (1989) disclose the preparation of aliphatic carboxylic acid esters of various fluorinated alcohols in general as lubricants and their use as lubricants for ferromagnetic metal thin film-type magnetic recording media.

Adding perfluoroalkyl ethyl stearate, a non-curing ("non-drying") fluoroalkyl ethanol ester of a saturated vegetable oil, for instance, to alkyd, urethane, or unsaturated polyester coatings in suitable formulations, however, does not provide durable oil and water repellency. Since the fluorinated component is saturated, it is not chemically bound with the cured polymer. Thus the oil repellency is not durable and is readily lost when the surface is washed or otherwise cleaned. By durable oil repellency and durable increased hexadecane contact angles are meant that the surface properties of the cured coatings are retained following surface cleaning.

Certain perfluoroalkyl ethyl esters that do not react with enamel binders have been listed by Deibig et al. in German patent DE 28 21 495 C2 and include bis(perfluorohexylethyl)maleate. Bis(perfluoroalkylethyl) maleate esters behave similarly to the stearyl esters and do not show durable oil repellency after scrubbing. Presumably the double bond in the ester is sufficiently deactivated by two immediately adjacent fluoroalcohol ester groups and is not sufficiently incorporated into the binder to provide durable oil repellency.

It is highly desirable to be able to provide cost effective and wash resistant oil repellency to alkyd coatings, Type I urethane coatings, and polyester coatings. The present invention provides such coatings.

SUMMARY OF THE INVENTION

The present invention comprises a coating composition comprising

A. an ester of an unsaturated alcohol and a fluorinated acid of the formula I

$$R_f\text{-}X\text{-}CO\text{-}O\text{-}R$$

wherein $R_f$ is a $C_2$–$C_{20}$ perfluoroalkyl radical, or a $C_5$–$C_{38}$ perfluoroalkyl radical having at least one ether oxygen atom;

R is a $C_3$ to $C_{21}$ unsaturated aliphatic hydrocarbon radical, optionally aryl substituted, or a mixture thereof;

X is —$(CH_2)_m$—, —$C_6H_4$—, —$CON(R_1)R_2$—, —$SO_2N(R_1)R_2$—, —$(CH_2)_sSO_y(CH_2)_t$—, —$(CH_2)_s$-$SO_y$-CH($CH_3$)$CH_2$—, or —$(CH_2)_s$-$SO_y$-$CH_2$-CH($CH_3$)—, wherein m is 2 to about 20; s is 1 to about 12; t is 1 to about 17; y is 0, 1 or 2; $R_1$ is hydrogen or alkyl of 1 to about 12 carbon atoms; $R_2$ is alkylene having 1 to about 12 carbon atoms; and B. an alkyd, urethane or unsaturated polyester resin; wherein a cured coating resulting from said coating composition has an advancing hexadecane contact angle of at least about 40 degrees.

The present invention further comprises a cured coating composition comprising the above-described coating composition in a dried or cured state after evaporation of the volatile components and substantial completion of any polymerization reactions associated with the curing process.

The present invention further comprises a method of improving the oil repellency and water repellency of an alkyd, urethane or unsaturated polyester coating composition comprising adding to said composition an effective amount of the ester of an unsaturated alcohol and fluorinated acid as defined above.

DETAILED DESCRIPTION OF THE INVENTION

This invention comprises coating compositions containing an alkyd, urethane or unsaturated polyester resin and an ester of an unsaturated alcohol and a fluorinated acid wherein a cured coating resulting from said coating composition has an advancing hexadecane contact angle of at least about 40 degrees.

By the term "alkyd coating", as used hereinafter, is meant a conventional liquid coating based on alkyd resins, which contain unsaturated aliphatic acid residues derived from drying oils, wherein said resins spontaneously polymerize in the presence of oxygen or air to yield a solid protective coating as a result of autoxidation of the unsaturated bonds by atmospheric oxygen. Included are acrylic alkyd resins wherein an acrylic polymer has been reacted with drying oil fatty acids. The coatings typically include a paint, clear coating, or stain. The alkyd resins are complex branched and cross-linked polyesters.

By the term "urethane coating", as used hereinafter, is meant a conventional liquid coating based on Type I urethane resins containing a prereacted autoxidizable binder, typically a paint, clear coating, or stain. Urethane coatings typically contain the reaction product of a polyisocyanate, usually toluene diisocyanate, and a polyhydric alcohol ester of drying oil acids. The cured coating is formed by air oxidation and polymerization of the unsaturated drying oil residue in the binder.

By the term "unsaturated polyester coating", as used hereinafter, is meant a conventional liquid coating based on unsaturated polyester resins, dissolved in monomers and containing initiators and catalysts as needed, typically as a paint, clear coating, or gel coat formulation. The resin contains as the unsaturated prepolymer the product obtained from the condensation polymerization of a glycol with an unsaturated acid in the form of anhydrides. The prepolymer is a linear polymer containing unsaturation in the chain end and is dissolved in a suitable monomer to produce the resin. A cured coating is produced by copolymerization of the linear polymer and monomer by means of a free radical mechanism.

By the term "coating composition", as used herein, is meant a liquid formulation of alkyd, Type I urethane resin, or unsaturated polyester resin, as applied to a substrate. Included are paints, varnishes, finishes, enamels and similar materials.

By the term "cured coating" as used herein is meant the final decorative and/or protective film obtained after the volatile components of a coating composition have evaporated and the polymerizations associated with the curing process are substantially completed.

The ester of an unsaturated alcohol and a fluorinated acid used in this invention has the formula:

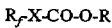

$R_f$-X-CO-O-R wherein $R_f$, X and R are as previously defined.

$R_f$ is a $C_2$–$C_{20}$ perfluoroalkyl radical, or a $C_5$–$C_{38}$ perfluoroalkyl radical having at least one either oxygen atom.

More particularly $R_f$ is selected from the group consisting of a) or b):

a) $F(CF_2)_n$-; and b) $F(CF_2)_z$—O-B—wherein n is 2 to about 20, z is 1 to about 6, and B is —[CF($CF_3$)$CF_2$-O]$_q$-CF($CF_3$)— wherein q is 3 to about 10.

Preferred examples of $R_f$-X— from the above definitions of $R_f$ are as follows:

1) $F(CF_2)_n(CH_2)_m$— wherein n and m are as previously defined;

2) $F(CF_2)_nCH_2CH_2SO_yCH_2CH_2$— wherein n and y are as previously defined;

3) $F(CF_2)_n$-CO-N($R_1$)$R_2$— wherein n, $R_1$ and $R_2$ are as previously defined;

4) $F(CF_2)_n$-$SO_2$-N($R_1$)$R_2$— wherein n, $R_1$, and $R_2$ are as previously defined;

5) $F(CF_2)_3$-O-[CF($CF_3$)-O]$_q$-CF($CF_3$)-CO-N($R_1$)$R_2$— wherein q, $R_1$ and $R_2$ are as previously defined and;

6) $F(CF_2)_3$-O-[CF($CF_3$)-O]$_q$-CF($CF_3$)-$SO_2$-N($R_1$)$R_2$ wherein q, $R_1$ and $R_2$ are as previously defined.

Particularly preferred is an ester of the present invention which is $R_f$-$CH_2CH_2$-S-$CH_2CH_2$-$CO_2$R wherein $R_f$ is $F(CF_2)_n$-, n is 2 to about 20, and R is a $C_3$–$C_{21}$ unsaturated aliphatic hydrocarbon radical, optionally aryl substituted, preferably by phenyl.

The fluorinated carboxylic acid esters of unsaturated alcohols of the present invention are useful as components of the coating compositions of the present invention. The coating compositions of the present invention are useful for providing a protective and/or decorative coating to a wide variety of substrates. Such substrates include primarily construction materials and hard surfaces such as wood, metal, wallboard, masonry, concrete, fiberboard, paper and other materials. Upon application, such coating compositions cure by conventional methods, and the cured coatings of the present invention exhibit several valuable properties. Specifically, the cured coatings of this invention, compared with the conventional cured coatings, exhibit improved anti-blocking properties, and improved oil and water repellency and durability thereof, as demonstrated by contact angle measurements. The improved oil and water repellency results in improved soil resistance and cleanability of the surface of the cured coating. The fluorinated esters migrate preferentially to the surface of the coating of the present invention, and by reason of their unsaturation, become chemically bound to the cured resin of the coating, the latter property providing durability to the improved oil and water repellency. By durable oil repellency and durable increased hexadecane contact angles are meant that the advantageous surface properties of the cured coatings of the present invention are retained following cleaning of the surface. Thus the oil and water repellency and cleanability are retained after conventional washing of the surface.

The coating compositions of this invention contain a mixture of an alkyd, Type I urethane, or unsaturated polyester resin and sufficient fluorinated esters of the above structures such that the coating composition contains 50–10,000μg/g by weight of fluorine, and preferably 150–5,000μg/g of fluorine, in the non-volatile content of the composition. The cured coating of this invention resulting from said composition has a durable advancing hexadecane contact angle of not less than 40 degrees and a durable receding hexadecane contact angle of not less than 20 degrees.

The contact angle formed between a surface and a drop of liquid is a measure of the wettability or repellency of the surface to the liquid. A wettable surface has low contact angles close to zero degrees, a repellent surface has higher contact angles. Thus the contact angle formed by an oily liquid such as hexadecane is widely used as a measure of the oil repellency of a surface. In general, higher hexadecane contact angles indicate that a surface has greater dirt and soil resistance and repellency, and easier cleanability.

The fluorinated carboxylic acid esters of unsaturated alcohols used in this invention are prepared by conventional synthetic organic procedures. Such procedures include direct esterification of a fluorinated acid with an unsaturated alcohol, or transesterification between an alkyl ester of a fluorinated acid and an unsaturated alcohol. The conversion of the fluorinated acid or its alkyl ester to an ester of the unsaturated alcohol is maximized by using a molar excess of the unsaturated alcohol. Typically about a 10% molar excess of the unsaturated alcohol is used.

Fluorinated carboxylic acids, including those useful for this invention, are prepared by a number of synthetic procedures documented in the literature. For example, perfluoroalkyl or perfluoropolyether carboxylic acids are prepared by the hydrolysis of the corresponding carboxylic acid fluorides. Example reactions include:

$$F(CF_2)_n\text{-COF} + H_2O \rightarrow F(CF_2)_n\text{-CO}_2H$$

$$F(CF_2)_z\text{-O-[CF(CF}_3)CF_2\text{-O-]}_q\text{-CF(CF}_3)\text{-COF} + H_2O \rightarrow$$

$$F(CF_2)_z\text{-O-[CF(CF}_3)CF_2\text{-O-]}_q\text{-CF(CF}_3)CO_2H$$

wherein n, z and q are as previously defined.

The perfluoroalkyl carboxylic acid fluorides are prepared by the electrochemical fluorination of the corresponding hydrocarbon carboxylic acids or by the reaction of tetrafluoroethylene telomer iodides with fuming sulfuric acid. Perfluoropolyether carboxylic acid fluorides derived from hexafluoropropylene oxide are prepared as intermediates during the manufacture of synthetic vacuum pump fluids sold under the trade name "KRYTOX" available from E.I. dupont de Nemours and Company, Wilmington, Del. Perfluoroalkyl carboxylic acids are also prepared (R. N. Haszeldine, J. Chem. Soc. (1952), 3423) by carbonation of perfluoroethylene telomer iodide derived Grignards.

Fluorinated acid amides of the general formula $$F(CF_2)_n\text{-CO-N(R}_1)R_2\text{-CO}_2H$$

wherein n, $R_1$, and $R_2$ are as previously defined are prepared by reaction of a perfluoroalkyl carboxylic acid fluoride and an amino acid, as disclosed in U.S. Pat. No. 3,238,235. Fluorinated acid amides of the formula $$R_f\text{-O-[CF(CF}_3)CH_2\text{-O-]}_q\text{-CF(CF}_3)\text{-CO-N(R}_1)R_2\text{-CO}_2H$$

are prepared by reaction of the corresponding poly (tetrafluoropropylene oxide)carboxylic acid fluoride and an amino acid, as disclosed in U.S. Pat. No. 3,798,265.

The preparation of perfluoroalkylalkylcarboxylic acids of the following general formulas $$R_f\text{-(CH}_2)_a\text{-CO}_2H, R_f\text{-(CH}_2CF_2)_{b-1}\text{-CH}_2CO_2H, \text{ and}$$

$$R_f\text{-[CH}_2C(R_3)]_{b-1}\text{-CH}_2CO_2H$$

wherein a is 3 to 14 and b is 1 to 3 are described in U.S. Pat. Nos. 2,951,051; 3,954,817; and 4,002,657 respectively.

Perfluoroalkylpropionitriles, prepared by the hydrocyanation of perfluoroalkylethylenes, as disclosed in Organofluorine Chemistry Principles and Commercial Applications (Plenum Press, New York N.Y., 1994), are converted to the corresponding perfluoroalkylpropionic acids by acid hydrolysis.

Perfluoroalkyl terminated alkylene thioalkanoic acids of the general formula $$F(CF_2)_n\text{-(CH}_2)_s\text{-S-(CH}_2)_r\text{-CO}_2H$$

are prepared as disclosed in U.S. Pat. No. 3,172,910 and converted to the corresponding sulfoxy or sulfonyl alkanoic acids as disclosed in U.S. Pat. No. 3,940,435. Perfluoroalkyl terminated alkylenethioalkanoic acids are also prepared by a process analogous to that according to U.S. Pat. No. 4,946,992, by reaction of a thiol substituted alkanoic acid and a perfluoroalkyl substituted alkyl halide.

The acidity of the fluorinated carboxylic acid so prepared is dependent upon the proximity of the perfluoroalkyl radical to the carboxyl group. When the groups are adjacent, as for perfluoroalkyl carboxylic acids, the acidity approaches that of a mineral acid. The acid is corrosive and its ester derivatives are relatively easily hydrolyzed. The strong acidification effect of the perfluoroalkyl group upon the acidity of the carboxyl hydrogen fades out with increasing distance between these groups.

The esters of fluorinated carboxylic acids and unsaturated alcohols of highest utility for the coating compositions of this invention are prepared from fluorinated carboxylic acids in which the perfluoroalkyl and carboxlic acid groups are separated by a linking group comprised of two or more atoms and from unsaturated alcohols which contain at least one double bond which can participate in the drying or curing of the coating compositions.

Requisite alcohols, such as 1) cinnamyl alcohol, 2) oleyl alcohol, or 3) a fatty alcohol mixture are commercially available. These unsaturated alcohols can be obtained from 1) Fisher Scientific, Pittsburgh, Pa. , 2) Aldrich Chemical Co., Milwaukee, Wis.; and 3) Henkel Corporation, Cincinnati, Ohio respectively.

The present invention further comprises a method of improving the oil and water repellency of an alkyd, urethane or unsaturated polyester coating composition comprising adding to said composition an effective amount of an ester as previously described. The fluorinated esters of unsaturated alcohols can be incorporated into the coating compositions in a molten condition or after dissolution in a compatible solvent. Melting or dissolution provides a method to insure the fluorinated esters are readily and completely mixed in the coating composition. Alternatively, the reaction mixture in which the esters were synthesized may be used, without isolation of the esters, provided any reaction solvents were chosen to be appropriate for the final coating composition and the reaction product is heated to ensure homogeneity. Examples of solvents compatible with the components of the coating compositions used in this invention are mineral spirits, deodorized mineral spirits, Stoddard solvent, and other solvents compatible with the specific coating composition and coating.

To prepare the coating compositions of the present invention containing an alkyd resin, the fluorinated esters are heated to about 90° C. with stirring until a homogeneous and fully melted mixture is obtained. The homogeneous mixture is poured into the alkyd coating composition and stirred to give a homogeneous mixture. Alternatively, the heated fluorinated esters of unsaturated alcohols are dissolved in a suitable solvent compatible with the alkyd coating composition, such as Stoddard solvent, and the solution of fluorinated esters subsequently added to the alkyd coating compositions.

The preparation of the coating compositions of the present invention containing Type I urethanes and a fluorinated ester as previously described is accomplished as described above for alkyd-containing coating compositions. The preparation of the coating compositions of the present invention containing unsaturated polyesters and the fluorinated esters previously described is accomplished as described above for the alkyd-containing coating compositions, with the addition of the fluorinated esters being made to the alkyd/styrene mix.

Methods of application of the coating compositions of the present invention to surfaces are essentially unaffected by the addition of the fluorinated esters of unsaturated alcohols.

While not wishing to be bound by theory, it is believed that the mechanism of the generation of the advantageous properties of the cured coating compositions used in this invention is due to bonding of the ester to the coating during curing. It is believed that the fluorinated esters of unsaturated alcohols used in this invention, when applied to a surface as part of a liquid coating composition, migrate to the film surface before curing, becoming concentrated at the surface, and are chemically bound into the coating during curing, thus providing durable oil and water repellency to the cured coating.

Water repellent surfaces resulting from an oriented fluorocarbon surface, including the surfaces of the coatings used in this invention, are frequently subject to reversible "inversion" on prolonged exposure to water or aqueous solutions. The water repellency returns after drying.

TEST METHODS

Test Method 1—Contact Angle

Contact angles are measured by the Sessile Drop Method which is described in A. W. Adamson, "The Physical Chemistry of Surfaces", Fifth Edition, Wiley & Sons, New York, 1990. Additional information on the equipment and procedure for measuring contact angles is provided by R. H. Dettre et al. in "Wettability", Ed. by J. C. Berg, Marcel Dekker, New York, 1993.

In the Sessile Drop Method, a Ramè-Hart optical bench available from Ramè Hart Inc., 43 Bloomfield Ave., Mountain Lakes, N.J., is used to hold the substrate in the horizontal position. The contact angle is measured at a prescribed temperature with a telescoping goniometer from the same manufacturer. A drop of test liquid is placed on a surface and the tangent is precisely determined at the point of contact between the drop and the surface. An advancing angle is determined by increasing the size of the drop of liquid and a receding angle is determined by decreasing the size of the drop of liquid. The data are presented typically as advancing and receding contact angles.

The relationship between water and organic liquid contact angles, and cleanability and dirt retention of surfaces is described in A. W. Adamson, above. In general, higher hexadecane contact angles are indicative that a surface has greater dirt and soil resistance and repellency, and easier cleanability of the surface.

By durable oil repellency and durable increased hexadecane contact angles are meant that the advantageous surface properties of cured coatings of the present invention are retained following various simulations of surface cleaning.

The water and hexadecane advancing and receding contact angles of the coating compositions of the present invention were measured on coatings cast on 16.5 cm×43 cm (6.5×17 inch) Leneta P-121-10N dull black, scrub test panels available from Leneta Company, Mahwah, N.J. The coating compositions were prepared as described above with the fluoroester added in an amount to give a 1000μg/g fluorine concentration in the blended product. The fluoroester-containing coating composition was applied to the Leneta test panel using a 7 mil film caster. The test panel was anchored to a Gardco DP-1218L Leveling Drawdown Plate and was cleaned before coating by wiping with isopropyl alcohol wet cheesecloth. The coated panel was cured for seven days at ambient room conditions before testing.

Test Method 2—Detergent Wash Durability

Wash durability of the fluoroester containing coating composition to surface cleaning was determined using a Gardco Model D10 Wash & Wear Tester (Paul N. Gardner Co., Pompano Beach Fla.) and a Gardco WA-2225 abrasion boat. A 16.5 cm×2.5 cm (6.5×1 inch) test strip cut from the coated Leneta test panel was positioned on the test sample tray and fastened thereto with 1.9 cm (¾ inch) wide transparent tape such that about a 5×1.9 cm (2×¾ inch) portion of the coated test panel would be scrubbed. The abrasion boat base plate was covered with a folded 23 cm×23 cm (9×9 inch) piece of De Royal Textiles Idealfold bleached grade 20B cottoncheese cloth available from DeRoyal Textiles, Camden, S.C. The cheesecloth was folded perpendicular to the seam in half and half again and was fastened to the base plate such that the scrubbing surface layers were seam free. The cheesecloth pad was wet with 20 ml of a 1% aqueous Tide detergent (Proctor and Gamble Co., Cincinnati, Ohio) solution before the test strip was scrubbed. The test strip was removed after 10 scrub cycles, water washed free of the Tide solution and air dried one day before advancing and receding hexadecane contact angles were measured on the scrubbed surface.

Test Method 3—Anti-Blocking Test

ASTM 4946-89 provides a method for measuring the anti-blocking (non-stick) properties of surface coatings. The painted surfaces of flat panels are placed face-to-face. A No. 8 stopper is placed atop the pair, and a 1000 g weight is placed atop the stopper, creating a pressure of 1.8 psi (12.4 kPa). The weighted pair is held for 30 minutes at 120°+/−5° F. (49°+/−3° C.), then cooled at room temperature for 30 minutes. Samples are then peeled and tack rating noted. The blocking resistance is assessed according to the Table 1 below:

TABLE 1

ASTM 4946-89 Anti-Blocking Test Ratings

| Blocking Resistance Numerical Ratings | Type of Separation | Performance |
|---|---|---|
| 10 | no tack | perfect |
| 9 | trace tack | excellent |
| 8 | very slight tack | very good |
| 7 | very slght to slight tack, | good to very good |
| 6 | slight tack | good |
| 5 | moderate tack | fair |
| 4 | very tacky; no seal | poor to fair |
| 3 | 5–25% seal | poor |
| 2 | 25–50% seal | poor |
| 1 | 50–75% seal | very Poor |
| 0 | 75–100% seal | very poor |

The general procedure of ASTM 4946-89 was used to measure the anti-blocking properties of the coating compositions of this invention as a function of cure days. The measurements were made using 1.5×1.5 inch (3.8×3.8 cm) sections cut from coated Leneta scrub test panels prepared as described above.

EXAMPLES

Example 1

A 250 ml 4-necked round-bottom flask fitted with a mechanical agitator, temperature control device, Dean-Stark trap, condenser, nitrogen inlet and nitrogen outlet was charged with a 61.80 gm mixture of 3-perfluoroalkylpropionic acids, acid number 90.9, prepared by the acid hydrolysis of the corresponding 3-perfluoroalkylpropionitriles, of the formula $F(CF_2CF_2)_nCH_2CH_2CN$, where n is 4 to 9, predominantly 4, 5, and 6; 27.33 gm Henkel 3318 HD OCENOL 110/130, a fatty alcohol mixture (iodine value 122.5) containing about 8% of 1-hexadecanol, 6% of 1-octadecanol, 40% of 1-octadecenols including oleyl alcohol and 46% of 1-octadecadienols including linoleyl alcohol by GC/MS analysis, available from Henkel Corporation, 115017 Northlake Drive, Cincinnati, Ohio 45249; and 0.16 gm aqueous phosphorus acid. The reaction mixture was heated to and held at about 135° C. for about 48 hours, at which time it was free of carboxylic acid functionality by infra-red analysis and contained 47.1% fluorine by combustion analysis. Esters having the following molecular weights were identified by GC/MS analysis as components of the reaction product mixture.

| | n | | | | | |
|---|---|---|---|---|---|---|
| R | 4 | 5 | 6 | 7 | 8 | 9 |
| $C_{16}H_{33}$* | 716 | 816 | 916 | 1016 | | |
| $C_{18}H_{37}$* | 744 | 844 | 944 | 1044 | 1144 | 1244 |
| $C_{18}H_{35}$ | 742 | 842 | 942 | 1042 | 1142 | 1242 |
| $C_{18}H_{33}$ | 740 | 840 | 940 | 1040 | 1140 | |

R and n are as previously defined.
*In addition these saturated esters were present, derived from saturated components of the alcohol mixture.

Example 2

A 250 ml 4-necked round-bottom flask equipped as in Example 1 was charged with a 28.87 gm mixture of 3-perfluoroalkylpropionic acids, acid number 97.6, prepared by the acid hydrolysis of the corresponding 3-perfluoroalkylpropionitriles of the formula $F(CF_2)_nCH_2CH_2CN$, where n is 3 to 9, predominantly 4, 5, and 6; 41.99 gm crotyl alcohol, 97% (mixture of isomers) from Aldrich Chemical Company 1001 West Saint Paul Avenue, Milwaukee, Wis. 53233; and 0.15 gm aqueous 70% phosphorus acid. The reaction mixture was heated to and held at about 115° C. for about 42 hours, and then heated to and held at about 130° C. for an additional 21 hours, with periodic draining of the Dean-Stark trap collected distillate. The recovered product was a soft solid with a fluorine content of 59.0% by combustion analysis. Esters having the following molecular weights were identified by GS/MS analysis as components of the reaction product mixture.

| | n | | | | | | |
|---|---|---|---|---|---|---|---|
| R | 3 | 4 | 5 | 6 | 7 | 8 | 9 |
| $C_4H_7$ | 446 | 546 | 646 | 746 | 846 | 946 | 1046 |

R and n are as previously defined.

Example 3

A 250 ml 4-necked round-bottom flask equipped as in Example 1 was charged with a 100.74 gm mixture of 82% 6-perfluoroalkyl-3-thia-hexanoic acids of the formula $F(CF_2CF_2)_nCH_2CH_2SCH_2CH_2CO_2H$, where n is 2 to 8, predominantly 3, 4 and 5, and 18% isopropyl esters thereof, said mixture prepared by the base catalyzed reaction of perfluoroalkylethyliodides and 3-mercaptopropionic acid by a process analogous to that according to U.S. Pat. No. 4,946,992; 53.96 gm Henkel 3318 HD-OCENOL 110/130 as defined in Example 1; and 0.15 gm aqueous 70% phosphorus acid. The reaction mixture was heated to and held at about 145° C. for about 48 hours, at which time it was free of carboxylic acid functionality by infra-red analysis and contained 35.9% fluorine by combustion analysis. Esters having the following molecular weights were identified by GC/MS analysis as components of the reaction product mixture.

| | n | | | |
|---|---|---|---|---|
| R | 2 | 3 | 4 | 5 |
| $C_{16}H_{33}$* | | 676 | 776 | |
| $C_{18}H_{37}$* | | 704 | 804 | 904 |
| $C_{18}H_{35}$ | 602 | 702 | 802 | 902 |
| $C_{18}H_{33}$ | | 700 | 800 | 900 |

R and n are as previously defined.
*In addition these saturated esters were present, derived from saturated components of the alcohol mixture.

Example 4

A 250 ml 4-necked round-bottom flask equipped as in Example 1 was charged with a 80.30 gm mixture of 79% 6-perfluoroalkyl-3-thio-hexanoic acids of the formula $F(CF_2CF_2)_nCH_2CH_2SCH_2CH_2CO_2H$, where n is 2 to 8, predominately 3, 4, and 5 and 21% isopropyl esters thereof, said mixture prepared by the base catalyzed reaction of perfluoroalkylethyliodides and 3-mercaptopropionic acid by a process analogous to that according to U.S. Pat. No. 4,946,992; 24.46 g Acros Organics cinnamyl alcohol; and 0.18 gm 70% phosphorus acid. The mixture was heated to and held at about 145° C. for about 41 hours, with additions of 0.3957 gm and 0.2630 gm "TYZOR" TPT tetraisopropyl titanate available from E. I. du Pont de Nemours and Company, Wilmington, Del., at about 20 and 24 elapsed hours, respectively. The isolated product contained 42.7% fluorine by combustion analysis. Product esters having the following molecular weights were identified by GC/MS analysis as components of the reaction mixture.

| R | n | | | | |
|---|---|---|---|---|---|
|   | 2 | 3 | 4 | 5 | 6 |
| $C_9H_9$ | 468 | 568 | 668 | 768 | 868 |

R and n are as previously defined.

Example 5

A 250 ml 4-necked round-bottom flask equipped as in Example 1 was charged with a 98.41 gm mixture of 93% 6-perfluoroalkyl-3-thia-hexanoic acids of the formula $F(CF_2CF_2)_nCH_2CH_2SCH_2CH_2CO_2H$, where n is 3 to 8, predominantly 4, 5 and 6, and about 7% isopropyl esters thereof, said mixture prepared by the base catalyzed reaction of perfluoroalkylethyliodides and 3-mercaptopropionic acid by a process analogous to that according to U.S. Pat. No. 4,946,992; 43.14 gm Henkel 3318 HD-OCENOL 110/130 as defined in Example 1; and 0.14 gm aqueous 70% phosphorus acid. The reaction mixture was heated to and held at about 145° C. for about 26 hours to yield fluorinated ester, at which time it was free of carboxylic acid functionality by infra-red analysis and contained 43.3% fluorine by combustion analysis.

Example 6

A 250 ml 4-necked round-bottom flask equipped as in Example 1 was charged with a 88.03 gm mixture of 6-perfluoroalkyl-3-sulfonyl-hexanoic acids (acid number 43.0) of the formula $F(CF_2CF_2)_nCH_2CH_2SO_2CH_2CH_2CO_2H$, where n is 2 to 8, predominantly 3 and 4, said mixture prepared by the oxidation of the corresponding 6-perfluoroalkyl-3-thia-hexanoic acids by a process analogous to that according to U.S. Pat. No. 3,940,435 and isopropyl esters thereof; 43.28 gm Henkel 3318 HD-OCENOL 110/130 as defined in Example 1 and 0.19 gm aqueous phosphorus acid. The reaction mixture was heated to and held at about 145° C. for about 68.5 hours, with the addition of 1.4712 gm "TYZOR" TPT tetraisopropyl titanate available from E. I. du Pont de Nemours and Company, Wilmington, Del., at about 48.5 elapsed hours. The recovered product contained 35.9% fluorine by combustion analysis.

Example 7

A 250 ml 4-necked round-bottom flask equipped as in Example 1 was charged with a 71.85 gm methyl ester mixture obtained by the methanolysis of poly (hexafluoropropylene oxide) acid fluorides of the formula $F(CFCF_3CF_2O)_nCFCF_3COF$, where n is 5 to 15 (average 9), and 25.72 gm Henkel 3318 HD-OCENOL 110/130 as defined in Example 1. The mixture was heated to and held at about 150° C. for about 24 hours, with the additions of 0.2737 gm and 0.2639 gm "TYZOR" TPT tetraisopropyl titanate available from E. I. du Pont de Nemours and Company, Wilmington, Del., at about zero and 5 elapsed hours, respectively. The recovered, colorless liquid ester fraction was free of residual poly(hexafluoropropylene oxide) acid methyl esters and contained 54.0% fluorine by combustion analysis.

Comparative Examples A and B illustrate the poor wash durability of esters of an unsaturated alcohol and a fluorinated acid in which the perfluoroalkyl and carboxylic acid functionality is not separated by a linking group comprised of two or more atoms.

Comparative Examples C and D illustrate the poor wash durability of esters of a fluorinated acid and an unsaturated alcohol which does not contain at least one double bond which can participate in the drying or curing of the coating composition.

Comparative Example E illustrates the poor wash durability of an ester of a fluorinated acid and a saturated alcohol.

Comparative Example A

A 250-ml 4-necked round-bottom flask equipped as in Example 1 was charged with a 59.88 gm mixture of perfluoroalkanoic acids (acid number 112.4) prepared by the carbonation of perfluoroethylene telomer iodide derived Grignards (R. N. Haszeldine, J. Chem. Soc. (1952) 3423) of the formula $F(CF_2)_nCO_2H$, where n is 6 to 18, predominantly 8 and 10; 34.42 gm Henkel 3318 HD-OCENOL 110/130 as defined in Example 1; and 0.14 gm aqueous 70% phosphorus acid. The reaction mixture was heated to and held at about 145° C. for about 24 hours, at which time it was free of carboxylic acid functionality by infra-red analysis and contained 43.5% fluorine by combustion analysis. Esters having the following molecular weights were identified by GC/MS analysis as components of the reaction product mixture.

| R | n | | | |
|---|---|---|---|---|
|   | 8 | 10 | 12 | 14 |
| $C_{16}H_{33}$* | 688 | 788 | 888 |      |
| $C_{18}H_{37}$* | 716 | 816 | 916 |      |
| $C_{18}H_{35}$  | 714 | 814 | 914 | 1014 |
| $C_{18}H_{33}$  | 712 | 812 | 912 | 1012 |

R and n are as previously defined.
*In addition these saturated esters were present, derived from saturated components of the alcohol mixture.

Comparative Example B

A 250-ml 4-necked round-bottom flask equipped as in Example 1 was charged with a 57.96 gm mixture of perfluorooctanoic acids (a mixture of about 78% normal and 22% branched chain isomers obtained from PCR Inc., P.O. Box 1466, Gainesville, Fla. 32602); 40.01 gm Henkel 3318 HD-OCENOL 110/130 as defined in Example 1; and 0.16 gm 70% aqueous phosphorus acid. The mixture was heated to and held at about 145° C. for about 22 hours to yield fluorinated ester, at which time the mixture was free of carboxylic acid functionality by infra-red analysis and contained 39.4% fluorine by combustion analysis.

Comparative Example C

A 250 ml 4-necked round-bottom flask equipped as in Example 1 was charged with 100.08 gm of a mixture of 79% 6-perfluoroalkyl-3-thio-hexanoic acids of the formula $F(CF_2CF_2)_nCH_2CH_2SCH_2CH_2CO_2H$, where n is 2 to 8, predominately 3, 4, and 5 and 21% isopropyl esters thereof, said mixture prepared by the procedure of Example 5; 46.74 gm Acros Organics farnesol, 96% (a mixture of four 3,7, 11-trimethyl-2,6,10-dodecatriene-1-ol isomers) (Fisher Scientific, 711 Forbes Avenue, Pittsburgh, Pa. 15219); and 0.21 gm aqueous 70% phosphorus acid. The mixture was heated to and held at about 145° C. for about 45 hours when an additional 4.75 gm farnesol, 96% was added. The reaction product, isolated after a total of 70 hours, contained 37.0% fluorine by combustion analysis. Product esters having the following molecular weights were identified as components of the reaction mixture.

| | | n | |
|---|---|---|---|
| R | 3 | 4 | 5 |
| $C_{15}H_{25}$ | 656 | 756 | 856 |

R and n are as previously defined.

Comparative Example D

A 250 ml 4-necked round-bottom flask equipped as in Example 1 was charged with a 79.17 gm mixture of about 96% 6-perfluoroalkyl-3-thia-hexanoic acids of the formula $F(CF_2CF_2)_nCH_2CH_2SCH_2CH_2CO_2H$, where n is 2 to 8, predominantly 3, 4 and 5, and about 4% isopropyl esters thereof, said mixture prepared by the base catalyzed reaction of perfluoroalkylethyliodides and 3-mercaptopropionic acid by a process analogous to that according to U.S. Pat. No. 4,946,993; 27.83 gm Aldrich Chemical Company beta-citronellol, 95% (a mixture of 3,7-dimethyl-6-octen-1-ol plus small amounts of a decanol, a second decenol, and four decadienols by GC/MS analysis); and 0.16 gm aqueous 70% phosphorus acid. The reaction mixture was heated to and held at about 140° C. for about 27 hours, at which time it was free of carboxylic acid functionality by infra-red analysis and contained 41.3% fluorine by combustion analysis. Product esters having the following molecular weights were identified by GC/MS analysis as components of the reaction mixture.

| | | | n | | |
|---|---|---|---|---|---|
| R | 2 | 3 | 4 | 5 | 6 |
| $C_{10}H_{17}$ | | 588 | 688 | | |
| $C_{10}H_{19}$ | 490 | 590 | 690 | 790 | 890 |
| $C_{10}H_{21}$* | | 592 | 692 | | |

R and n are as previously defined.
*In addition these saturated esters were present, derived from saturated components of the alcohol mixture.

Comparative Example E

A 250 ml 4-necked round-bottom flask equipped as in Example 1 was charged with a 80.35 gm mixture of 79% 6-perfluoroalkyl-3-thia-hexanoic acids of the formula $F(CF_2CF_2)_nCH_2CH_2SCH_2CH_2CO_2H$, where n is 2 to 8, predominantly 3, 4 and 5, and 21% isopropyl esters thereof, said mixture prepared by the base catalyzed reaction of perfluoroalkyl-ethyliodides and 3-mercaptopropionic acid by a process analogous to that according to U.S. Pat. No. 4,946,992; 48.21 gm stearyl alcohol, 95% from Aldrich Chemical Company, Milwaukee, Wis.; and 0.20 gm aqueous 70% phosphorus acid. The reaction mixture was heated to and held at about 140° C. for about 23.5 hours, at which time 0.5740 gm "TYZOR" TPT tetraisopropyl titanate available from E. I. du Pont de Nemours and Company, Wilmington, Del., was added and heating at about 140° C. continued. The product recovered after a total of about 41 hours was a hard, near colorless solid with a fluorine content of 33.4% by combustion analysis. Esters having the following molecular weights were identified by GC/MS analysis as components of the of the reaction product mixture.

| | | n | | |
|---|---|---|---|---|
| R | 2 | 3 | 4 | 5 |
| $C_{16}H_{33}$ | | 676 | | |
| $C_{18}H_{37}$ | 604 | 704 | 804 | 904 |

Example 8

The esters of Examples 1 to 7, and Comparative Examples A to E were mixed into Benjamin Moore and Company, Montvale, N.J. 07645 IMPERVO™ White Alkyd High Gloss Enamel in an amount to give a 1000µg/g fluorine concentration in the blended product. The resultant ester-containing composition and a control sample containing no added ester were cast on a Leneta P-121-10N dull black, scrub test panel and the coating evaluated by Test Methods 1, 2 and 3 as described above.

TABLE 2

| | Test 1 Contact Angle | | | | Test 2 Wash Durability | | Test 3 Anti-blocking | | | | | | |
|---|---|---|---|---|---|---|---|---|---|---|---|---|---|
| | Water | | Hexadecane | | Hexadecane | | Cure Day | | | | | | |
| Ex. No. | Adv | Rec | Adv | Rec | Adv | Rec | 1 | 2 | 3 | 4 | 5 | 6 | 7 |
| 1 | 124 | 93 | 81 | 36 | 70 | 25 | 9 | 9 | 10 | | | | |
| 2 | 112 | 75 | 70 | 39 | 58 | 21 | 9 | 10 | | | | | |
| 3 | 119 | 87 | 82 | 65 | 58 | 28 | 1 | 3 | 7 | | | | 8 |
| 4 | 123 | 86 | 83 | 67 | 65 | 42 | 3 | 5 | 6 | | | 7 | 8 |
| 5 | 128 | 92 | 84 | 69 | 79 | 54 | 10 | | | | | | |
| 6 | 125 | 96 | 81 | 63 | 62 | 28 | 7 | 9 | 8 | | | 9 | 9 |
| 7 | 104 | 65 | 65 | 45 | 42 | 15 | 9 | 10 | | | | | |
| A | 98 | 56 | 58 | 30 | 35 | 0 | 5 | 8 | 8 | | | 8 | 8 |
| B | 103 | 56 | 45 | 28 | 16 | 0 | | | | | | | |
| C | 64 | 38 | 82 | 71 | 9 | 0 | 7 | 7 | 8 | | | 8 | 8 |
| D | 122 | 73 | 84 | 62 | 32 | 0 | 1 | 4 | 6 | | | 8 | 8 |
| E | 134 | 99 | 85 | 36 | 60 | 0 | 7 | 8 | 8 | | | 9 | 9 |
| control | 83 | 42 | 18 | 0 | 15 | 0 | 3 | 3 | 5 | | | 7 | 7 |

Example 9

The esters of Example 1, 4 and 6 were mixed into 1) Enterprise Gloss Polyurethane available from the Valspar Corporation, Wheeling, Ill. 60090, 2) SWP Exterior Gloss Oil Base Paint (white) available from the Sherwin-Williams Company, Cleveland, Ohio 44101, and 3) Duron Exterior Alkyd House Paint (white) available from Duron Inc., Beltsville, Md. 20705, in an amount to give 1000μg/g fluorine concentration in the blended product. The resultant ester-containing composition and a control containing no added ester were cast on a Leneta P-121-10N dull black scrub test panel and the coating evaluated by Test Methods 1, 2 and 3 as described above. The resulting data are shown in Table 3, 4 and 5 for the Enterprise, SWP and Duron paints respectively.

TABLE 3

| | Test 1 Contact Angle | | | | Test 2 Wash Durability | | Test 3 Anti-blocking | | | | | | |
|---|---|---|---|---|---|---|---|---|---|---|---|---|---|
| | Water | | Hexadecane | | Hexadecane | | Cure Day | | | | | | |
| Ex. No. | Adv | Rec | Adv | Rec | Adv | Rec | 1 | 2 | 3 | 4 | 5 | 6 | 7 |
| 1 | 122 | 84 | 81 | 38 | 81 | 39 | 10 | | | | | | |
| 4 | 129 | 86 | 85 | 72 | 84 | 73 | 7 | 8 | 8 | | | 10 | |
| 6 | 126 | 86 | 82 | 68 | 81 | 68 | 9 | 9 | 9 | | | 10 | |
| control | 93 | 55 | 22 | 12 | 20 | 9 | 7 | 7 | 7 | | | 8 | 8 |

TABLE 4

| | Test 1 Contact Angle | | | | Test 2 Wash Durability | | Test 3 Anti-blocking | | | | | | |
|---|---|---|---|---|---|---|---|---|---|---|---|---|---|
| | Water | | Hexadecane | | Hexadecane | | Cure Day | | | | | | |
| Ex. No. | Adv | Rec | Adv | Rec | Adv | Rec | 1 | 2 | 3 | 4 | 5 | 6 | 7 |
| 1 | 123 | 86 | 81 | 32 | 80 | 37 | 8 | 9 | 9 | | 9 | 10 | |
| 4 | 124 | 80 | 85 | 62 | 82 | 59 | 0 | 3 | 5 | | | 8 | |
| 6 | 128 | 91 | 82 | 60 | 80 | 54 | 6 | 8 | 8 | | | 9 | |
| control | 83 | 28 | 37 | 28 | 17 | 0 | 0 | 3 | 3 | | | 6 | 7 |

TABLE 5

| | Test 1 Contact Angle | | | | Test 2 Wash Durability | | Test 3 Anti-blocking | | | | | | |
|---|---|---|---|---|---|---|---|---|---|---|---|---|---|
| | Water | | Hexadecane | | Hexadecane | | Cure Day | | | | | | |
| Ex. No. | Adv | Rec | Adv | Rec | Adv | Rec | 1 | 2 | 3 | 4 | 5 | 6 | 7 |
| 1 | 127 | 87 | 82 | 40 | 81 | 40 | 7 | 8 | 8 | | | 10 | |
| 4 | 124 | 81 | 84 | 68 | 82 | 69 | 0 | 4 | 6 | | 7 | 9 | |
| 6 | 127 | 88 | 83 | 66 | 82 | 64 | 6 | 7 | 7 | | 8 | 10 | |
| control | 98 | 53 | 12 | 8 | 15 | 0 | 0 | 0 | 2 | | | 7 | 7 |

What is claimed is:

1. A coating composition comprising

A. an ester of an unsaturated alcohol and a fluorinated acid of the formula $$R_f\text{-X-CO-O-R}$$

wherein $R_f$ is a $C_2$–$C_{20}$ perfluoroalkyl radical or a $C_5$–$C_{38}$ perfluoroalkyl radical having at least one ether oxygen atom;

R is a $C_3$ to $C_{21}$ unsaturated aliphatic hydrocarbon radical, optionally aryl substituted, or a mixture thereof;

X is —$(CH_2)_m$—, —$C_6H_4$—, —$CON(R_1)R_2$—, —$SO_2N(R_1)R_2$—, —$(CH_2)_sSO_y(CH_2)_t$—,

—$(CH_2)_sSO_y$-$CH(CH_3)CH_2$— or —$(CH_2)_sSO_y$-$CH_2$-$CH(CH_3)$—wherein m is 2 to about 20; s is 1 to about 12; t is 1 to about 17; y is 0, 1 or 2; $R_1$ is hydrogen or alkyl of 1 to about 12 carbon atoms; and $R_2$ is alkylene having 1 to about 12 carbon atoms; and B. an alkyd, urethane or unsaturated polyester resin; wherein a cured coating resulting from said coating composition has an advancing hexadecane contact angle of at least about 40 degrees.

2. The composition of claim 1 wherein $R_f$ is selected from the group consisting of $F(CF_2)n$- and $F(CF_2)_z$-O-B- wherein n is 2 to about 20, z is 1 to about 6, B is —[$CF(CF_2)CF_2$-O-]$_q$-$CF(CF_3)$—, and q is 3 to about 10.

3. The composition of claim 1 wherein $R_f$-X is selected from the group consisting of $F(CF_2)_n(CH_2)_m$-, $F(CF_2)_n$-$CH_2CH_2$-$SO_y$-$CH_2CH_2$-, $F(CF_2)_n$-CO-$N(R_1)R_2$-, $F(CF_2)_n$-$SO_2$-$N(R_1)R_2$-, $F(CF_3)$ -O-[$CF(CF_3)$-O]$_q$-$CF(CF_3)$-CO-N$(R_1)R_2$- and $F(CF_2)_3$-O-[$CF(CF_3)$-O]$_q$-$CF(CF_3)$-$SO_2$-$N(R_1)R_2$- wherein n is 2 to about 20; q is 3 to about 10; m is 2 to about 20; y is 0, 1 or 2; $R_1$ is hydrogen or alkyl of 1 to about 12 carbon atoms; and $R_2$ is alkylene having 1 to about 12 carbon atoms.

4. The composition of claim 1 which is $R_f$-$CH_2CH_2$-S-$CH_2CH_2$-$CO_2R$ wherein $R_f$ is $F(CF_2)_n$-, n is 2 to about 20, and R is a $C_3$ to $C_{21}$ unsaturated aliphatic hydrocarbon radical, optionally aryl substituted.

5. The composition of claim 1 having from about 50 to about 10,000μg/g by weight of fluorine based on non-volatile content of the coating.

6. A cured coating composition comprising

A. an ester of an unsaturated alcohol and a fluorinated acid of the formula

wherein $R_f$ is a $C_2$–$C_{20}$ perfluoroalkyl radical or a $C_5$–$C_{38}$ perfluoroalkyl radical having at least one ether oxygen atom;

R is a $C_3$ to $C_{21}$ unsaturated aliphatic hydrocarbon radical, optionally aryl substituted, or a mixture thereof;

X is —$(CH_2)_m$—, —$C_6H_4$—, —CON $(R_1)R_2$—, —$SO_2$N $(R_1)R_2$—, —$(CH_2)_sSO_y(CH_2)_t$—, —$(CH_2)_sSO_y$-CH$(CH_3)CH_2$— or —$(CH_2)_sSO_y$-$CH_2$-$CH(CH_3)$— wherein m is 2 to about 20; s is 1 to about 12; t is 1 to about 17; y is 0, 1 or 2; $R_1$ is hydrogen or alkyl of 1 to about 12 carbon atoms; and $R_2$ is alkylene having 1 to about 12 carbon atoms; and B. an alkyd, urethane or unsaturated polyester resin; wherein said cured coating has an advancing hexadecane contact angle of at least about 40 degrees.

7. A method of improving the oil and water repellency of an alkyd, urethane or unsaturated polyester coating composition comprising adding to said coating composition an effective amount of an ester of an unsaturated alcohol and a fluorinated acid of the formula

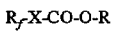

wherein $R_f$ is a $C_2$–$C_{20}$ perfluoroalkyl radical or a $C_5$–$C_{38}$ perfluoroalkyl radical having at least one ether oxygen atom;

R is a $C_3$ to $C_{21}$ unsaturated aliphatic hydrocarbon radical, optionally aryl substituted, or a mixture thereof; and X is —$(CH_2)_m$—, —$C_6H_4$—, —CON$(R_1)R_2$—, —$SO_2$N $(R_1)R_2$—, —$(CH_2)_sSO_y(CH_2)_t$—, —$(CH_2)_sSO_y$-CH$(CH_3)CH_2$— or —$(CH_2)_sSO_y$-$CH_2$-$CH(CH_3)$— wherein m is 2 to about 20; s is 1 to about 1 to about 17; y is 0, 1 or 2; $R_1$ is hydrogen or alkyl of 1 to about 12 carbon atoms; and $R_2$ is alkylene having 1 to about 12 carbon atoms.

* * * * *

UNITED STATES PATENT AND TRADEMARK OFFICE
CERTIFICATE OF CORRECTION

PATENT NO. : 5,670,573
DATED : September 23, 1997
INVENTOR(S) : Jack Robert Kirchner, William Wesley Bennett, Jr.

It is certified that error appears in the above-identified patent and that said Letters Patent is hereby corrected as shown below:

Column 2, line 4 — delete "can tale" and insert "can take"

Column 3, line 5 — delete "y is 0.1 or 2" and insert "y is 0, 1 or 2"

Column 4, line 16 — delete "either oxygen atom." and insert "ether oxygen atom."

Column 4, line 34 — delete "5) $F(CF_2)_3$-O-[$CF(CF_3)$-O]$_q$-$CF(CF_3)$-CO-$N(R_1)R_2$-" and insert "5) $F(CF_2)_3$-O-[$CF(CF_3)CF_2$-O]$_q$-$CF(CF_3)$-CO-$N(R_1)R_2$-"

Column 4, line 36 — delete "6) $F(CF_2)_3$-O-[$CF(CF_3)$-O]$_q$-$CF(CF_3)$-$SO_2$-$N(R_1)R_2$-" and insert "6) $F(CF_2)_3$-O-[$CF(CF_3)CF_2$-O]$_q$-$CF(CF_3)$-$SO_2$-$N(R_1)R_2$-"

Column 5, line 67 — delete "$R_f$-O-[$CF(CF_3)CH_2$-O-]$_q$-$CF(CF_3)$-CO-$N(R_1)R_2$-$CO_2H$" and insert "$R_f$-O-[$CF(CF_3)CF_2$-O-]$_q$-$CF(CF_3)$-CO-$N(R_1)R_2$-$CO_2H$"

Column 11, line 55 — delete "$F(CF(CF_3)CF_2O)_n CFCF_3 COF$" and insert "$F(CF(CF_3)CF_2O)_n CF(CF_3) COF$"

Column 17, lines 12-13 — delete "-[$CF(CF_2)CF_2$-O-]$_q$-$CF(CF_3)$-" and insert "-[$CF(CF_3)CF_2$-O-]$_q$-$CF(CF_3)$-"

UNITED STATES PATENT AND TRADEMARK OFFICE
CERTIFICATE OF CORRECTION

PATENT NO. : 5,670,573
DATED : September 23, 1997
INVENTOR(S) : Jack Robert Kirchner, It is certified that error appears in the above-identified patent and that said Letters Patent is hereby corrected as shown below:

Column 17, lines 17-18 — delete "$F(CF_3)\text{-}O\text{-}[CF(CF_3)\text{-}O]_q\text{-}CF(CF_3)\text{-}CO\text{-}N(R_1)R_2\text{-}$" and insert "$F(CF_2)_3\text{-}O\text{-}[CF(CF_3)CF_2\text{-}O]_q\text{-}CF(CF_3)\text{-}CO\text{-}N(R_1)R_2\text{-}$"

Signed and Sealed this

Twenty-fourth Day of March, 1998

Attest:

BRUCE LEHMAN

*Attesting Officer*  *Commissioner of Patents and Trademarks*